Oct. 21, 1924.　　　　　　　　　　　　　　　　1,512,688
F. G. HENRY
MACHINE FOR POLISHING RAZOR BLADES
Filed Feb. 2, 1921　　　　6 Sheets-Sheet 3

INVENTOR
Ferdinand G. Henry
BY
Newell & Spencer
ATTORNEYS

Oct. 21, 1924.  
F. G. HENRY  
1,512,688  
MACHINE FOR POLISHING RAZOR BLADES  
Filed Feb. 2, 1921    6 Sheets-Sheet 5

Oct. 21, 1924.  1,512,688

F. G. HENRY

MACHINE FOR POLISHING RAZOR BLADES

Filed Feb. 2, 1921   6 Sheets-Sheet 6

INVENTOR
Ferdinand G. Henry
BY
Newell and Spencer
ATTORNEYS

Patented Oct. 21, 1924.

1,512,688

UNITED STATES PATENT OFFICE.

FERDINAND G. HENRY, OF PHILADELPHIA, PENNSYLVANIA, ASSIGNOR, BY MESNE ASSIGNMENTS, TO WALDEN KNIFE COMPANY, OF WALDEN, NEW YORK, A CORPORATION OF NEW YORK.

MACHINE FOR POLISHING RAZOR BLADES.

Application filed February 2, 1921. Serial No. 441,713.

*To all whom it may concern:*

Be it known that I, FERDINAND G. HENRY, a citizen of the United States, residing at 2908 No. 26th St., North Philadelphia, Pennsylvania, have invented certain new and useful Improvements in Machines for Polishing Razor Blades, of which the following is a clear, full, and exact description.

This invention relates to machines for operating on blades.

The invention is illustrated in the present application as embodied in a machine for polishing the lateral faces of thin removable blades such as are employed in certain kinds of safety razors. The invention in all its aspects is not limited, however, to machines for polishing razor blades, but certain features of the invention may be embodied with advantage in machines for polishing other kinds of blades and certain features of the invention also may be employed in machines for performing other operations upon blades.

The principal objects of the invention are to improve the construction and mode of operation of machines for polishing blades of this character and to produce a blade polishing machine in which blades in large quantities may be polished in a rapid and efficient manner with a minimum expenditure of labor on the part of the operator and which may be operated by an unskilled operator.

With this and other objects in view, the invention comprises certain novel and improved features, constructions and combination of parts hereinafter described and particularly pointed out in the claims, the advantages of which will be readily understood and appreciated by those skilled in the art.

In the preferred form of the invention, the blades are carried successively past the polishing device by the movement of the blades through a guideway constructed for the passage of the blades therethrough by a movement of the blades in a direction substantially parallel with the blade plane, the guideway and polishing device being relatively arranged so that the lateral face of a blade is presented to the polishing device during the movement of a blade through the guideway past said device. The blades are carried successively through the guideway by means of a moveable blade actuator which preferably is provided with a blade receiving opening in which a blade is held to carry the same past the polishing device.

In this form of the invention the machine is provided with a removable supply galley arranged to hold a pack of blades face to face from which the blades are delivered in succession to the guideway and with a receiving galley also constructed to receive a pack of blades into which the blades are delivered in succession from the guideway. The galleys preferably are identical in construction, so that they are interchangeable and may be transferred from one to another of a series of machines for operating on blades, the receiving galley of one machine being employed as a supply galley of the next machine.

The invention will be clearly understood from the accompanying drawings illustrating a machine embodying the invention in its preferred form and the following detailed description of the constructions therein shown.

In the drawings—

Fig. 9 is a detail view in front elevation illustrating the blade actuator.

In the illustrated form of the invention the blade polishing mechanism comprises two co-operating polishing rolls 2 provided with peripheral abrading or polishing surfaces between which the blades are passed in succession to polish the lateral surfaces of the same. The polishing rolls 2 are secured respectively to the lower and upper ends of two rotating shafts 4 mounted to rotate in bearings in the outer ends of pivoted levers 6 and are rapidly driven by means of a belt 8 passing about pulleys 10 secured respectively to the shafts 4, about an idle pulley 12 fixed to a rotatable shaft 14 and about a pulley 16 secured to a driven shaft 18. The belt 8 is passed about the various pulleys in such a manner that the polishing rolls are driven in opposite directions as indicated by the arrows in Fig. 5. The pulley 12 is mounted so that it acts to maintain a constant tension on the belt 8 and thus to maintain an efficient driving connection between the pulley 16 and the driven pulleys 10. To this end, the shaft 14 is journaled in a bearing in a lever 20 pivoted on a stud 22. The lever 20 carries a rod 24 upon which is adjustably secured a weight 26 which constantly tends to swing the lever 20 outwardly of the machine.

The levers 6 are pivoted to swing in a plane substantially perpendicular to the axes of the polishing rolls to carry the rolls toward and from each other, and the rolls preferably are yieldingly pressed toward each other so that they will exert a pressure upon the opposite faces of a blade as the blade is passed between the rolls. The levers 6 are pivoted upon a shaft 28 and are acted upon by a coiled spring 30 which tends to swing the levers and the polishing rolls toward each other. The movement of the polishing rolls toward each other is limited by an adjustable abutment screw 32 mounted on the forward lever 6, the rear end of which screw is flattened so as to engage in a slot 34 formed in a projection on the rear lever 6. The screw 32 is threaded into a bushing 36 mounted to turn in the forward lever 6 to which bushing is secured a hand knob 38 by which the sleeve may be rotated, the connection between the knob and the sleeve allowing a certain amount of relative axial movement of the knob and sleeve. The sleeve is held in adjusted position in the lever 6 by means of a bolt 40 threaded into the sleeve the head of which engages the outer face of the knob 38. The knob 38 may be provided with graduations arranged to be brought into registration with a mark on the lever 6. When it is desired to adjust the screw 32, the bolt 40 is loosened and the knob 38 is turned, thereby rotating the sleeve 36 while the screw is held from turning by the engagement of its rear end in the slot 34.

Figure 12:
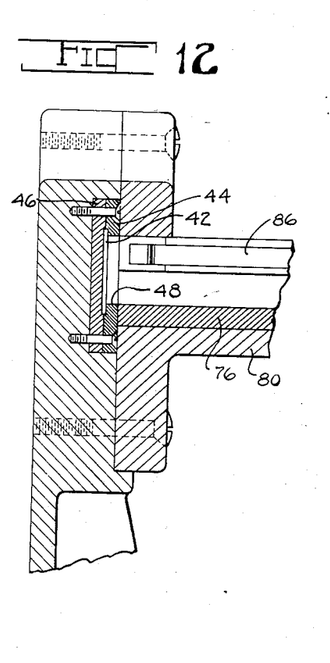
Fig. 12 is a detail sectional view taken substantially on the line 12—12 of Fig. 1.
Figure 13:
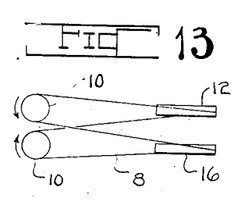
Fig. 13 is a diagrammatic view illustrating the driving connections for the polishing rolls.

The blades are introduced in succession between the polishing rolls 2 preferably by passing the blades through a guideway arranged for the passage of the blades therethrough by a movement of the blades in a direction substantially parallel with the blade plane. In the illustrated construction, this guideway indicated at 42 is formed by registering grooves in two plates 44 and 46, secured to the framework of the machine (see Figs. 5 and 12), and is constructed for the passage of blades endwise therethrough. To give the polishing rolls access to the blades as the blades are passed through the guideway, the plates 44 and 46 and that part of the frame at the rear of the plate 46 are cut away to receive the rolls, as clearly shown in Fig. 5. The blades are introduced successively into the guideway 42 preferably by movement of each blade in a direction substantially normal to the blade plane, the plate 44 being formed with an opening 48 through which the plates are introduced, in this manner, into the guideway.

In the preferred form of the invention the blades are carried in succession through the guideway by means of a reciprocating blade actuator. The blade actuator of the present machine indicated at 50 consists of a relatively long thin plate mounted to reciprocate longitudinally in the guideway 42 and provided with a blade-receiving opening 52. When a blade is introduced into the guideway 42, the blade actuator 50 is located with the blade-receiving opening 52 in registration with the opening 48 in the plate 44 so that a blade may be carried through the opening 48 into the opening 52 in the blade actuator, the movement of the blade being limited by engagement of the plate 46 with the rear face thereof. The blade actuator, after receiving a blade, moves to the left, thereby carrying the blade between the polishing rolls 2. The blade actuator is made slightly thinner than the blades to be operated upon so that the opposite faces of a blade located in the opening 52 will be engaged and polished by the polishing rolls as the blade is carried between the rolls. After a blade is acted upon by the polishing rolls, the movement of the blade actuator to the left continues until the opening 52 is located in registration with an opening 54 in the plate 44 through which the blade is discharged from the guideway 42 also by a movement in a direction substantially normal to the blade plane. After a blade is discharged in this manner from the guideway, the blade actuator again moves back to the right into position to receive another blade.

The mechanism for actuating the blade actuator in the manner described comprises a block 56 mounted to slide longitudinally on a rod 58 supported at its end in the frame of the machine and a rod 60 adjustably secured in the block 56 and attached to the outer end of the blade actuator. The block 56 is reciprocated on the rod 58 by means of a lever 62 pivoted at 64 on the frame, the upper end of which engages between lateral projections on the block. The lever 62 carries a cam roll 66 arranged to engage the periphery of a cam disc 68 secured to a cam shaft 70 and is acted upon by a coiled spring 72 which maintains the cam roll 66 constantly in engagement with the periphery of the cam disc 68.

In the illustrated embodiment of the invention the blades are delivered in succession through the opening 48 into the guideway 42 from a supply galley 74 and are transferred from the guideway through the opening 54 into a receiving galley 76. These galleys are preferably identical in construction and are removably mounted in the machine so that they may be transferred from one to another of a series of machines for operating upon blades. When a series of blades have been operated upon by one of these machines, the receiving galley, full of blades, may be taken from the machine and inserted in the next machine, as the supply galley and the empty supply galley of the machine may be inserted in the machine as the receiving galley.

Figure 1:
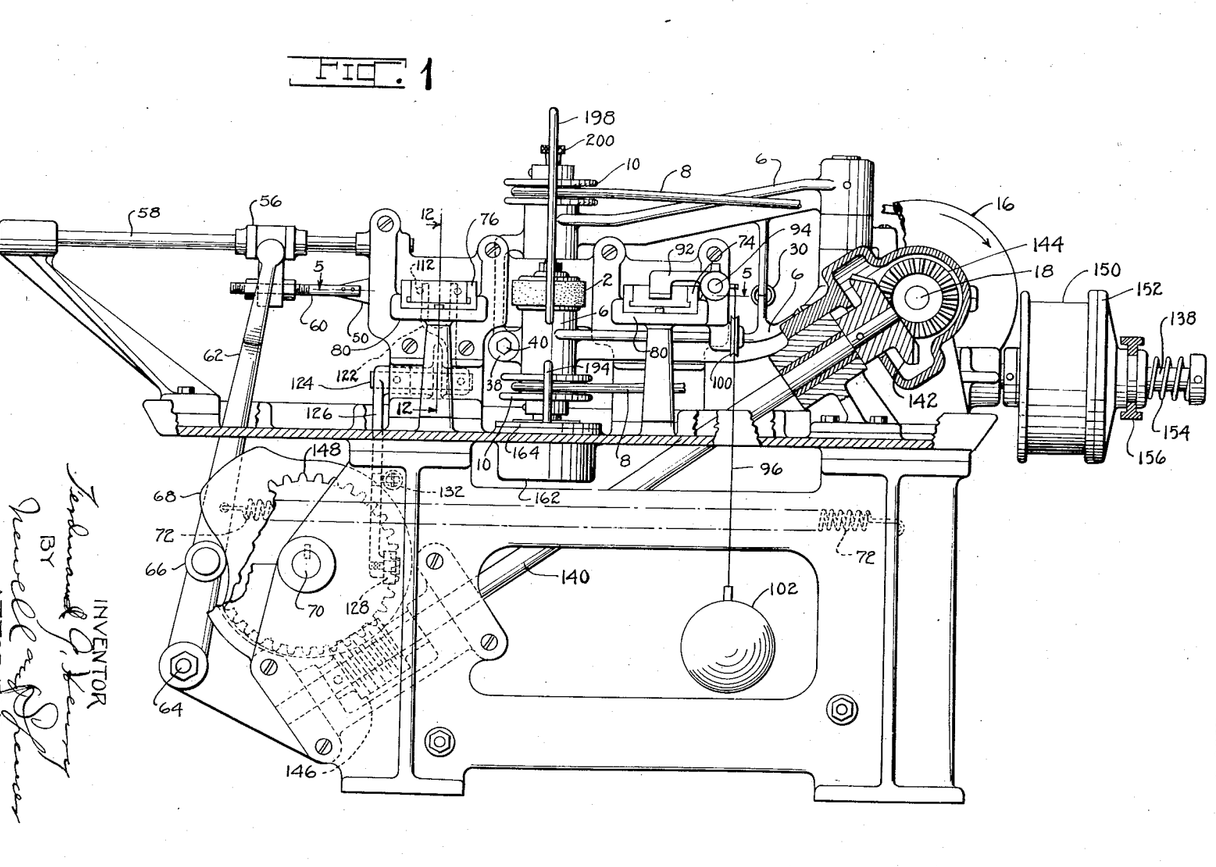
Fig. 1 is a view in front elevation partly in section, of a machine embodying the invention.
Figure 2:
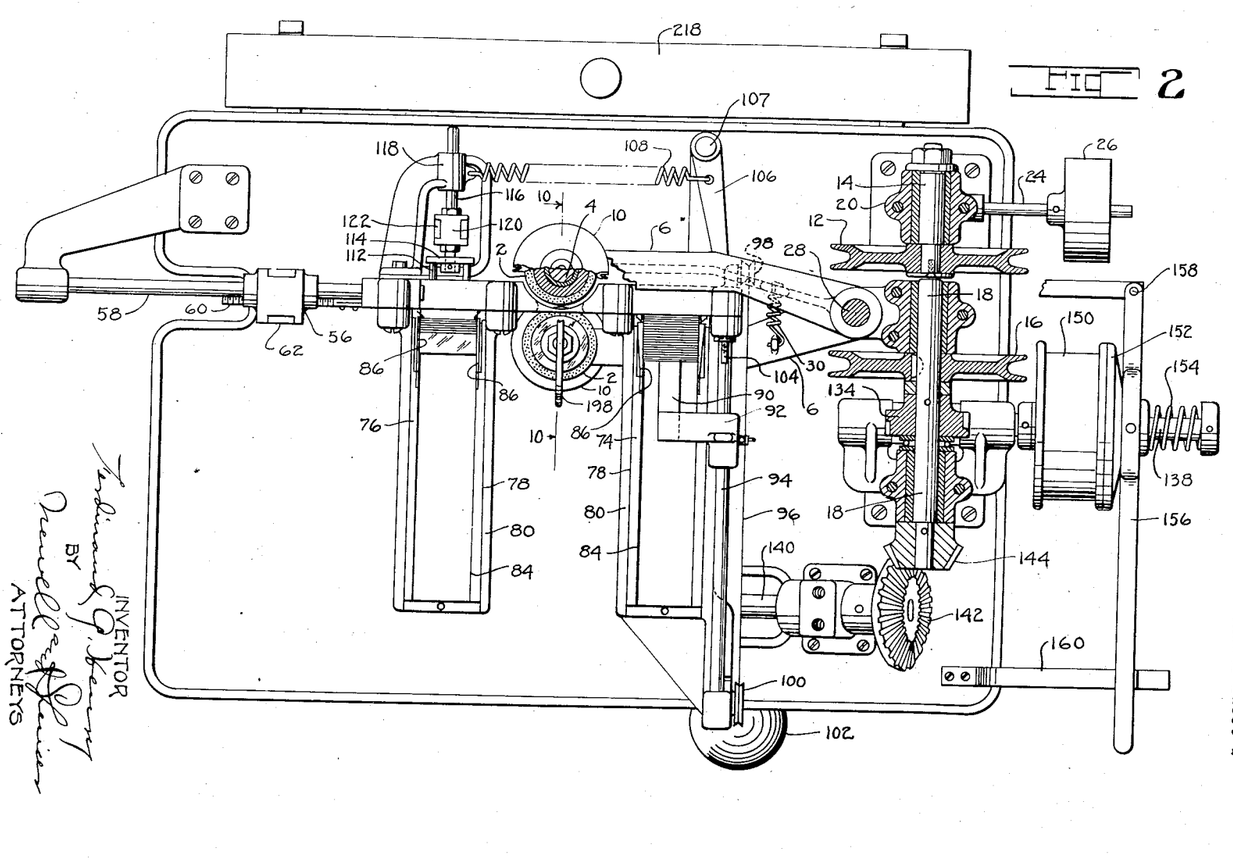
Fig. 2 is a plan view partly in section of the machine.
Figures 3, 8:
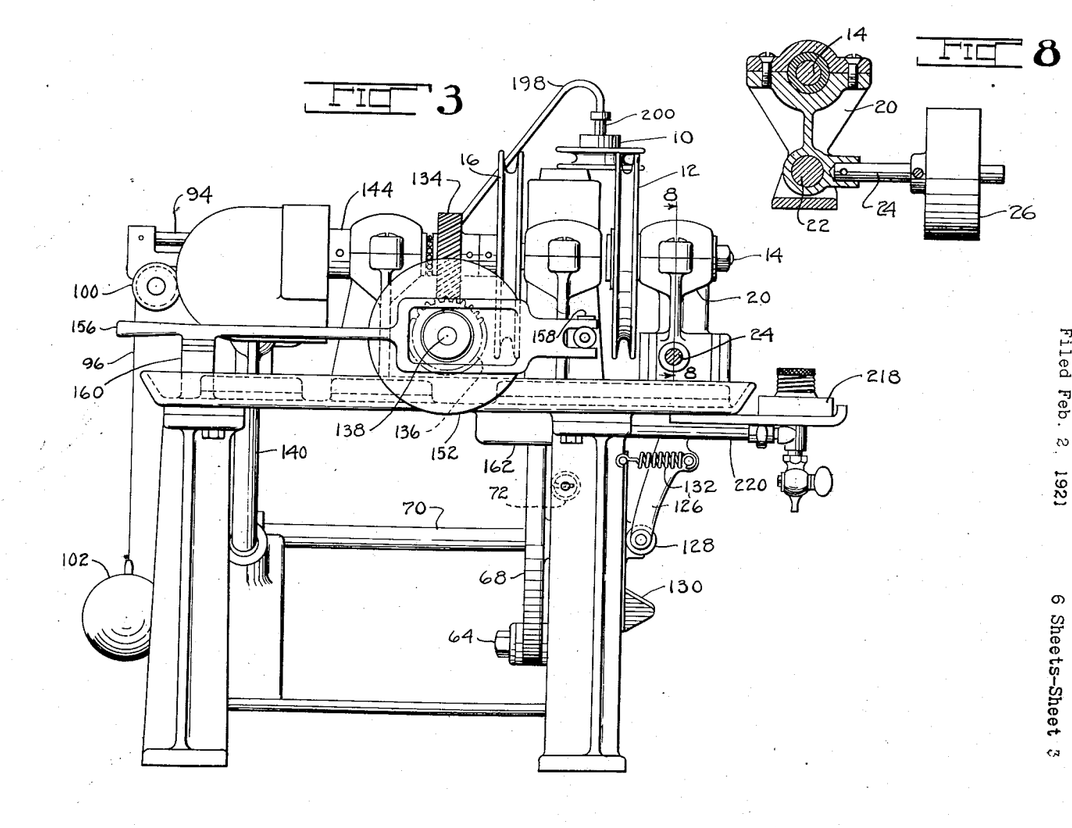
Fig. 3 is a view in side elevation of the machine looking from the right.
Fig. 8 is a detail sectional view taken substantially on the line 8—8 of Fig. 3.
Figure 4:
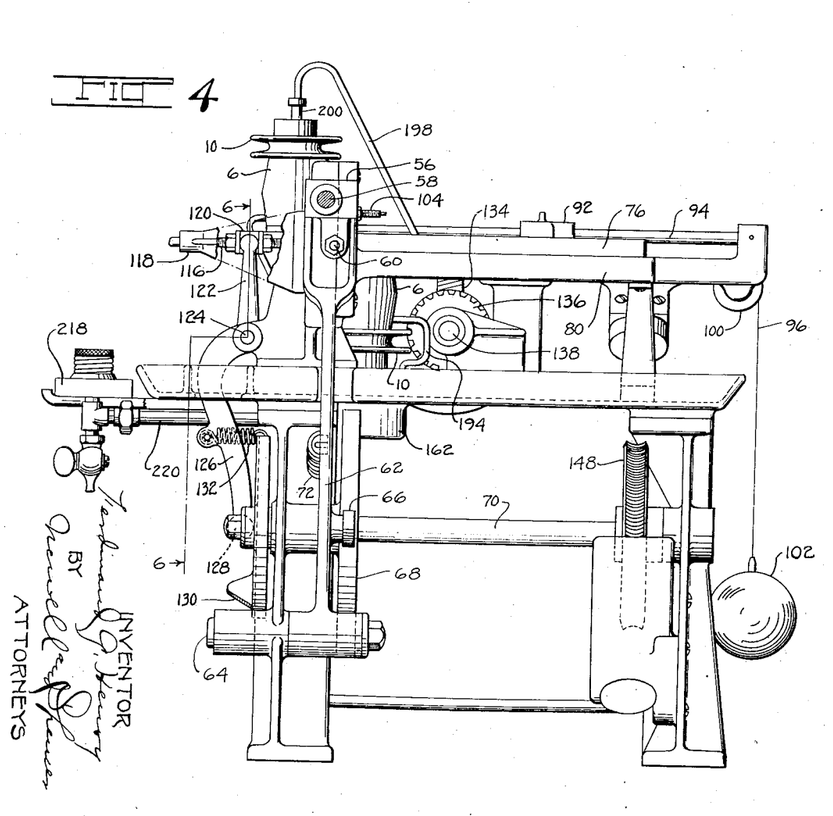
Fig. 4 is a view in side elevation of the machine looking from the left.
Figures 5, 6:
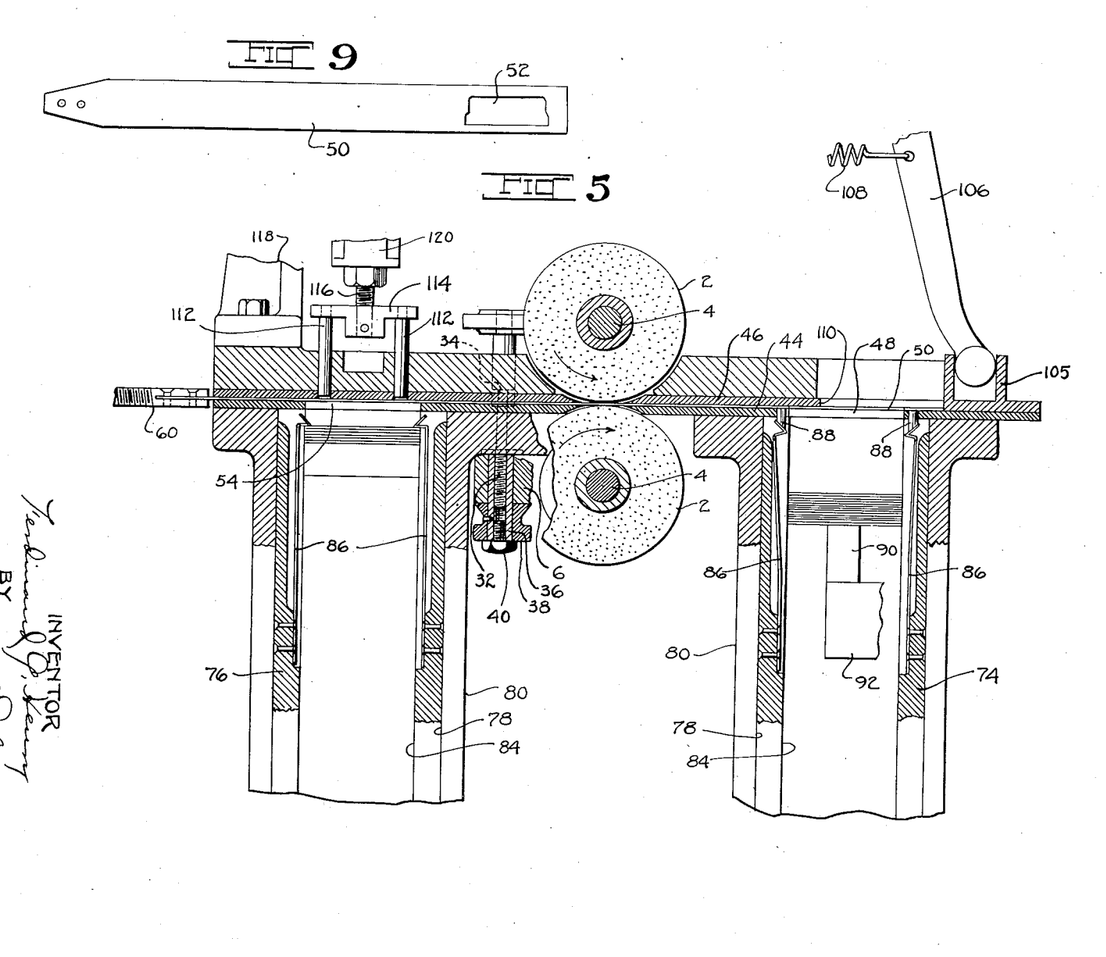
Fig. 5 is a view in horizontal section taken substantially on the line 5—5 of Fig. 1.
Fig. 6 is a detail view partly in rear elevation and partly in section taken substantially on the line 6—6 of Fig. 4.
Figure 6:
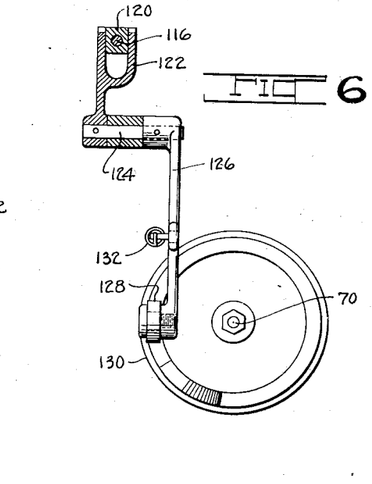
Figure 7:
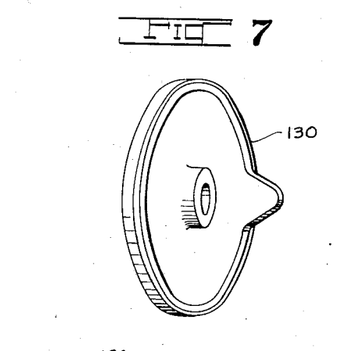
Fig. 7 is a detail perspective view illustrating one of the cam discs of the machine.
Figure 10:
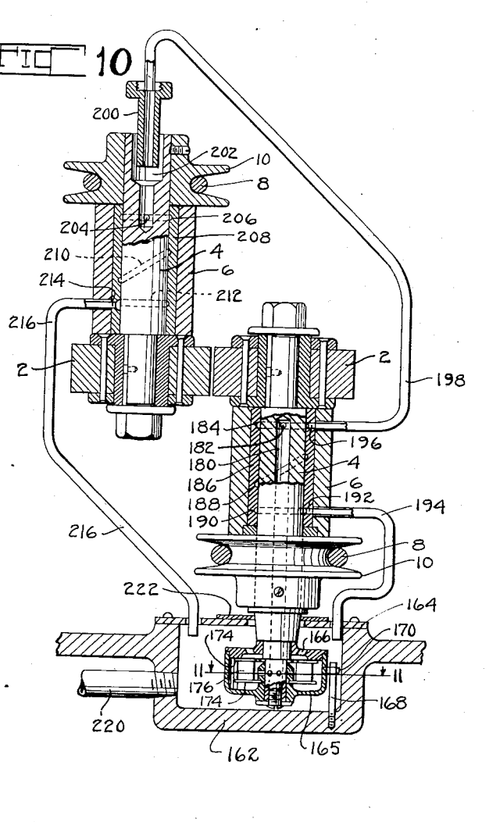
Fig. 10 is a detail sectional view taken substantially on the line 10—10 of Fig. 2.

The galleys are each mounted in grooves 78 formed in arms 80 on the frame of the machine, the galleys being preferably located so that they are substantially perpendicular to the guideway 42. The galleys are each provided with lateral ribs 84 forming a central blade receiving guideway, this guideway being adapted to receive a pack of blades placed face to face, as clearly shown in Figs. 2 and 5 of the drawings. A pair of blade retaining springs 86 is mounted on each of the galleys adjacent one end thereof, and are formed with inwardly bent portions arranged to engage the rear face of the rear blade of a pack placed in a galley to hold the blades in position. When a galley containing a pack of blades is inserted in the machine to serve as a supply galley, the free ends of the springs 86 are moved outwardly out of blade retaining position so that they will offer no resistance to the movement of the blades from the galley through the opening 48 into the guideway 42. To this end pins 88 are mounted on the plate 44 and are formed with bevelled ends arranged to engage correspondingly bevelled ends formed on the springs 86 and force the ends of the springs out of blade retaining position when a galley is inserted in the groove 78 for the supply galley. When a galley is placed in the groove 78 for the receiving galley, the springs 86 are allowed to assume their normal positions as shown in Fig. 5.

The machine is provided with mechanism arranged to act on the pack of blades in the supply galley, which tends constantly to force the pack of blades rearwardly through the central guideway in the galley. This mechanism comprises an arm 90 mounted on a block 92 and arranged to engage the forward blade of the pack in the supply galley. The block 92 is mounted to slide on a rod 94 supported at its ends in the frame of the machine and is connected with one end of a cable 96. The cable 96 extends from the block 92 over guide pulleys 98 and 100 and a weight 102 is attached to the other end of the cable which tends constantly to force the block rearwardly on the rod 94. The rearward movement of the block 92 is limited by its engagement with an adjustable abutment screw 104. Through the mechanism described the blades are carried in succession through the opening 48 and are inserted in the opening 52 in the blade actuator as the actuator reaches the proper position to receive a blade.

In order that as one blade is carried through the guideway between the polishing rolls by the left hand movement of the actuator the next succeeding blade in the pack from the supply galley may not be carried into the guideway 42, the machine is provided with a gate 105 for preventing the passage of the blades into the guideway at this point in the operation of the machine. The gate 105 is mounted in suitable guides on the frame of the machine to slide in directions lengthwise of the guideway 42 and is arranged to be engaged by the right hand end of the blade actuator 50. The gate is acted upon by a lever 106 pivoted at 107 on the frame, the forward end of which engages between projections on the gate as shown in Fig. 5. To the lever 106 is attached a coiled spring 108 which tends to swing the lever and to slide the gate 105 toward the left. As the blade actuator 50 moves toward the right, the end of the actuator engages the gate 105 and carries the same to the right therewith. As the blade actuator moves to the left, the gate 105 follows the actuator until the gate slides partially across the opening 48, so that it engages the rear blade of the pack from the supply galley, the movement of the gate being limited by a stop 110 formed on the plate 46. Then as the blade actuator continues its movement toward the left, the rear blade of the pack is prevented by the gate from being forced into the guideway 42.

When a blade within the opening 52 in the blade actuator is carried by the movement of the actuator into a position opposite the opening 54, the blade is pushed from the opening 52 into the receiving galley by movement of the blade in a direction substantially normal to the blade plane as above stated. During this movement of the blade the ends of the blade engage the bevelled ends of the retaining springs 86 and push back the ends of the springs, the blade being finally carried beyond the inwardly bent portions of the retaining springs into the position of the rear blade shown in Fig. 5, allowing the springs to swing back inwardly to blade retaining position.

The blades are pushed in this manner from the guideway 42 by means of reciprocating push pins 112 mounted to slide in suitable guide-bores in the frame of the machine and arranged to engage the rear face of a blade located within the opening 52 in the blade actuator. The pins 112 are carried by a cross-head 114 secured to the forward end of a rod 116 mounted to slide in a guide in an arm 118 on the frame of the machine. Upon the rod 116 is adjustably mounted a block 120 which is engaged by an actuating arm 122 secured to a rock shaft 124 mounted in a bearing in the frame, the upper end of the arm engaging between lateral projections on the block. To the rock shaft 124 is secured a second arm 126, which carries a cam roll 128 arranged to engage a lateral cam formed on a cam disk 130 secured to the cam shaft 70. The arm 126 is acted upon by a coiled spring 132 which normally maintains the cam roll 128 constantly in engagement with the cam disk 130. By the mechanism described, the rod 116 is reciprocated to impart the required movements to the push pins 112 in timed relation to the movements of the blade actuator 50.

The shaft 18 is driven through intermeshing spiral gears 134 and 136 from a shaft 138 which constitutes the main driving shaft of the machine. The cam shaft 70 is driven from the shaft 18 through an inclined counter shaft 140 connected with the shaft 18 by intermeshing bevel gears 142 and 144. The shaft 140 carries at its lower end a worm 146 which meshes with a worm wheel 148 secured to the cam shaft 70, the cam shaft thus being driven at slow speed relatively to the shaft 18.

To enable the machine readily to be stopped and started by the operator, the main shaft 138 is arranged to be driven through a friction clutch. Upon the shaft 138 is loosely mounted a driving pulley 150 adapted to receive a suitable driving belt, the right hand end of which pulley constitutes one member of the friction clutch. The other member of the friction clutch indicated at 152 consists of a disk connected to the shaft 138 to rotate therewith but movable longitudinally of the shaft to carry the same into and out of engagement with the driving pulley. The clutch member 152 is acted upon by a coiled spring 154 which tends to maintain the same constantly in engagement with the driving pulley. The clutch member 152 is moved longitudinally on the driving shaft 138 out of engagement with the driving pulley by means of a clutch actuating lever 156 pivoted at 158 on the frame, the central portion of which embraces the hub of the clutch member 152 and carries pivoted blocks arranged to engage within a groove in the hub of said clutch member. A latch bar 160 is provided for engagement with the lever 156 to hold the same in position to maintain the clutch out of engagement.

Figure 11:
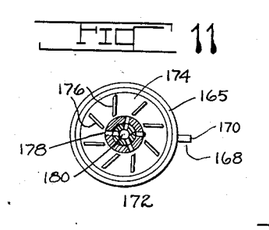
Fig. 11 is a detail sectional view taken substantially on the line 11—11 of Fig. 10.

The shafts 4 upon which the polishing rolls are mounted are rotated at a comparatively high speed so that it is important that the shafts be furnished with a liberal supply of oil. For this reason the machine is provided with an oiling mechanism which will practically eliminate any danger that the bearings for these shafts will become dry during the operation of the machine. The oiling mechanism for the polishing roll shafts 4 comprises an oil tank 162 formed by a recess in the frame of the machine and closed by a cover 164 from which tank the oil is pumped to the bearings for said shafts. A nonrotary casing 165 is mounted on the lower end of the lower shaft 4 and is formed with openings 166 through which the oil passes from the reservoir to the interior of the casing, the casing being held from rotary movement by means of a fixed pin 168 arranged to engage a pin 170 mounted on the casing. To the lower shaft 4 within the casing 164 is secured a centripetal pump 172 shown in detail in Fig. 11, which acts to pump the oil through the oil supplying system for the shafts 4. This pump comprises upper and lower spaced plates 174 between which are secured inclined blades or vanes 176 and the central barrel of the pump and the lower end of the shaft 4 are formed with openings 178 connected with a central bore 180 in the shaft. The pump 172 draws the oil from the casing 165 and forces the same upwardly through the bore 180. The upper end of the bore 180 is connected by a cross bore 182 with a circular groove 184 formed in a bushing 186 constituting the bearing for the shaft 4. Part of the oil delivered into the groove 184 is forced downwardly through a spiral groove 188 and through a circular groove 190 and an opening 192 in the bushing 186 into a return pipe 194, the lower end of which projects through a slot in the cover of the tank 162. This construction provides a liberal supply of oil for the bearing for the lower shaft 4. The remainder of the oil delivered into the groove 184 is forced outwardly through an opening 196 in the bushing 186 into a pipe 198 which delivers oil to the upper shaft 4. The oil passes from the pipe 198 through a nozzle 200 into a central bore 202 formed in the upper end of the upper shaft 4. The bore 202 is connected by a cross bore 204 with a circular groove 206 formed in a bushing 208 constituting the bearing for the upper shaft 4. The oil from a groove 206 is forced downwardly through a spiral groove 210, a circular groove 212 and an opening 214 formed in the bushing 208 into a return pipe 216, the lower end of which also projects through a slot in the cover of the tank 162. This latter construction provides a liberal supply of oil for the upper shaft 4.

Oil is supplied to the tank 162 from a reservoir 218 connected with the tank by a pipe 220.

The opening in the cover 164 for the tank through which the lower end of the lower shaft 4 projects is somewhat larger than the shaft to allow for the lateral movement of the shaft and this opening is closed by a plate 222 having a comparatively close fit about the shaft and arranged to slide relatively to the cover during the lateral movement of the shaft.

In the illustrated embodiment of the invention blades in large quantities may be rapidly presented to the polishing mechanism with the expenditure of very little labor on the part of the operator and the operation of the machine requires no particular skill. In operating the machine an empty receiving galley and a supply galley full of blades to be polished are placed respectively in the grooves 78 provided to receive the same and the lever 156 is disengaged from the latch bar 160 to start the machine. The blades will then be taken from the supply galley, passed between the polishing rolls and deposited in the receiving galley without any further attention on the part of the operator. When the blades have all been polished the operator actuates the lever 156 to disengage the main clutch, removes the receiving galley full of polished blades from the machine, inserts the empty supply galley, in the machine as the receiving galley, places a new supply galley full of blades in the machine and again starts the machine to repeat the operation.

Having explained the nature and object of the invention and having specifically described a machine embodying the invention in its preferred form, what is claimed is:

1. A machine for operating on blades having in combination means having a blade guideway, a polishing device arranged to polish the entire lateral face of a blade during its movement through the guideway, and a reciprocatory blade actuator mounted in the guideway.

2. A machine for operating on blades having in combination means having a blade guideway, an abrading device arranged to act on blades during their movement through the guideway and a reciprocatory blade actuator mounted in the guideway and having an opening in which a blade is held to carry the blade through the guideway.

3. A machine for operating on blades having in combination means having a blade guideway, two polishing devices arranged to polish respectively the entire opposite lateral faces of a blade during its passage through the guideway and a reciprocatory blade actuator arranged to carry a blade between and past the polishing devices.

4. A machine for operating on blades having in combination abrading devices arranged to act upon opposite lateral faces of a blade, a reciprocatory blade actuator having an opening in which a blade is received when the actuator is in advanced position and arranged to carry the blade by its engagement in said opening past the abrading devices during the retracting movement of the actuator and means for moving the blade actuator.

5. A machine for operating on blades having in combination means having a blade guideway, two opposed rotary polishing rolls arranged to engage opposite faces of a blade during its movement through the guideway and to polish the entire area of said faces, a reciprocatory blade actuator mounted in the guideway and arranged to carry a blade between and past the polishing rolls, means for pressing the polishing rolls into yielding engagement with a blade and means for rotating the polishing rolls.

6. A machine for operating on blades having in combination two opposed abrading devices arranged to engage opposite faces of a blade, a blade actuator arranged to reciprocate between the abrading devices and having an opening in which a blade is received when the actuator is in advanced position, the blade being carried between the abrading devices by its engagement in said opening during the retracting movement of the actuator and means for moving the blade actuator.

7. A machine for operating on blades having in combination means having a blade guideway, two opposed polishing rolls arranged to engage opposite faces of a blade during its movement through the guideway, means for holding said rolls yielding in contact with a blade, a reciprocatory blade actuator mounted in the guideway and having an opening in which a blade is held to carry the blade through the guideway and means for rotating the polishing rolls.

8. A machine for operating on blades having in combination means having a blade guideway, opposed abrading devices arranged to engage the lateral faces of a blade as it is carried through the guideway and a reciprocatory blade actuator having a blade receiving opening in which a blade is held to carry the blade through the guideway.

9. A machine for operating on blades having in combination means having a blade guideway, an abrading device for engaging one of the lateral faces of a blade mounted for movement in a direction transverse to the guideway and arranged to polish the entire lateral face of the blade, means for pressing said device yieldingly against a blade as the blade is carried through the guideway, and means for moving individual blades in succession through the guideway.

10. A machine for operating on blades having in combination means having a blade guideway, opposed abrading devices between which a blade is carried during its passage through the guideway arranged to polish the entire lateral faces of the blade and means for yieldingly pressing the abrading devices relatively toward each other to cause them to press yieldingly on a blade during the passage of the blade between the same.

11. A machine for operating on blades having in combination abrading devices arranged to act on the opposite faces of a blade, a movable blade actuator having an opening in which a blade is received when the actuator is in advanced position and arranged to present the blade through its engagement in said opening to the abrading devices during the retracting movement of the actuator, and means for supporting the actuator and controlling movement thereof.

12. A machine for operating on blades having, in combination, means having a blade guideway, an abrading device arranged to abrade the entire lateral face of a blade during its passage through the guideway, and means for moving the blade through the guideway.

13. A machine for operating on blades having, in combination, means having a blade guideway, an abrading device arranged to act on a blade during its passage through the guideway, a reciprocatory blade actuator arranged to receive a blade when in advanced position and to draw the blade through the guideway past the abrading device during its retracting movement, and means for advancing and retracting the blade actuator.

14. A machine for operating on blades having, in combination, a supply galley arranged to receive and hold in position a series of blades placed face to face, a similar receiving galley and means for taking the blades successively from the supply galley, polishing the entire lateral faces of the same and then depositing them in the receiving galley.

15. A machine for operating on blades having, in combination, means having a supply galley arranged to receive and hold in position a series of blades placed face to face, a similar receiving galley, an abrading device, a blade rectilinear guideway arranged to receive blades successively from the supply galley, present the lateral faces of the blades to the abrading device during their passage through the guideway and guide the blades into position to be introduced into the receiving galley and means for passing the blades successively through the guideway.

Signed at New York city, N. Y., this 1st day of February, 1921.

FERDINAND G. HENRY.